US007335100B2

(12) United States Patent
Romero

(10) Patent No.: US 7,335,100 B2
(45) **Date of Patent: *Feb. 26, 2008**

(54) BACCARAT GAMING ASSEMBLY

(75) Inventor: Santiago Romero, Guayaquil (EC)

(73) Assignee: Baccarat Plus Enterprises, Inc., Miami, FL (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/612,331

(22) Filed: Jul. 2, 2003

(65) Prior Publication Data

US 2004/0082372 A1 Apr. 29, 2004

Related U.S. Application Data

(63) Continuation-in-part of application No. 10/047,909, filed on Jan. 15, 2002, now Pat. No. 6,896,614, which is a continuation-in-part of application No. 09/794,307, filed on Feb. 27, 2001, now Pat. No. 6,805,628, which is a continuation-in-part of application No. 09/760,697, filed on Jan. 16, 2001, now Pat. No. 6,582,302, which is a continuation-in-part of application No. 09/546,365, filed on Apr. 10, 2000, now Pat. No. 6,585,586, which is a continuation-in-part of application No. 09/433,307, filed on Nov. 3, 1999, now Pat. No. 6,293,864.

(51) Int. Cl.
*G06F 17/00* (2006.01)

(52) U.S. Cl. .................................................. 463/11

(58) Field of Classification Search ............ 463/11-13, 463/27; 273/274, 292, 304, 306

See application file for complete search history.

(56) References Cited

U.S. PATENT DOCUMENTS

| | | | |
|---|---|---|---|
| 4,531,187 | A | 7/1985 | Uhland |
| 5,033,744 | A | 7/1991 | Bridgeman et al. |
| 5,154,429 | A | 10/1992 | LeVasseur |
| 5,174,579 | A | 12/1992 | Griffiths |

(Continued)

FOREIGN PATENT DOCUMENTS

AU 2001251276 B2 9/2006

(Continued)

*Primary Examiner*—Ronald Laneau
(74) *Attorney, Agent, or Firm*—Malloy & Malloy, P.A.

(57) ABSTRACT

A baccarat gaming assembly to play a variation of the game baccarat, the gaming assembly including a computer processor, a display and an input having at least one user actuatable selector. The computer processor is structured to generate a player's hand and a banker's hand in accordance with rules of baccarat, one of those hands being designated the user's hand based upon a user selection. Further, the computer processor is structured to deal the hands with an initially visible card in each hand, thereby allowing the user to better select which hand will be the user hand. Additionally, the computer processor is further responsive to a user input which designates whether to discard one or more of the visible cards in the hands, thereby increasing the chances for success. With the hands finally dealt, the computer processor is structured to determine a winning hand in accordance with the rules of baccarat, designating the user as a winner if the user's hand is also the wining hand. Additionally, the computer processor is structured to monitor the nature of the winning hand and/or to monitor consecutive hands and to indicate a bonus payout to the user in the event that the winning hand totals a natural nine or that consecutive ones of the user's hands have a final number count equal to a natural nine.

22 Claims, 10 Drawing Sheets

U.S. PATENT DOCUMENTS

| | | | |
|---|---|---|---|
| 5,226,661 | A | 7/1993 | Wolf |
| 5,362,064 | A | 11/1994 | Lofink et al. |
| 5,393,067 | A | 2/1995 | Paulsen et al. |
| 5,395,119 | A | 3/1995 | Jacob et al. |
| 5,398,938 | A | 3/1995 | Money |
| 5,417,430 | A | 5/1995 | Breeding |
| 5,505,449 | A | 4/1996 | Eberhardt et al. |
| 5,518,249 | A | 5/1996 | Sines et al. |
| 5,553,864 | A | 9/1996 | Sitrick |
| 5,586,766 | A | 12/1996 | Forte et al. |
| 5,605,333 | A | 2/1997 | Field |
| 5,605,334 | A | 2/1997 | McCrea, Jr. |
| 5,653,445 | A | 8/1997 | Quach |
| 5,669,606 | A | 9/1997 | Brown |
| 5,690,335 | A | 11/1997 | Skratulia |
| 5,702,106 | A | 12/1997 | Alvarez, Jr. |
| 5,707,287 | A | 1/1998 | McCrea, Jr. |
| 5,735,525 | A | 4/1998 | McCrea, Jr. |
| 5,743,530 | A | 4/1998 | Sklad et al. |
| 5,758,878 | A | 6/1998 | Brown |
| 5,794,964 | A | 8/1998 | Jones et al. |
| 5,806,854 | A | 9/1998 | Coleman et al. |
| 5,816,914 | A | 10/1998 | Wichinsky |
| 5,830,065 | A | 11/1998 | Sitrick |
| 5,831,527 | A | 11/1998 | Jones, II et al. |
| 5,839,731 | A | 11/1998 | Feola |
| 5,845,906 | A | 12/1998 | Wirth |
| 5,848,790 | A | 12/1998 | Huynh |
| 5,857,678 | A | 1/1999 | Coleman et al. |
| 5,873,572 | A | 2/1999 | Huynh |
| 5,876,283 | A | 3/1999 | Parra et al. |
| 5,911,626 | A | 6/1999 | McCrea, Jr. |
| RE36,255 | E | 7/1999 | Nguyen |
| 5,919,090 | A | 7/1999 | Mothwurf |
| 5,924,926 | A | 7/1999 | Brown |
| 5,934,988 | A | 8/1999 | Fischer |
| 5,934,998 | A | 8/1999 | Forte et al. |
| 5,941,769 | A | 8/1999 | Order |
| 5,984,310 | A | 11/1999 | English |
| 6,019,374 | A | 2/2000 | Breeding |
| 6,039,650 | A | 3/2000 | Hill |
| 6,062,979 | A | 5/2000 | Inoue |
| 6,070,878 | A | 6/2000 | Jones |
| 6,073,930 | A | 6/2000 | Jones et al. |
| 6,093,103 | A | 7/2000 | McCrea, Jr. |
| 6,117,012 | A | 9/2000 | McCrea, Jr. |
| 6,126,166 | A | 10/2000 | Lorson et al. |
| 6,154,131 | A | 11/2000 | Jones, II et al. |
| 6,164,651 | A | 12/2000 | Webb |
| 6,165,069 | A | 12/2000 | Sines et al. |
| 6,179,292 | B1 | 1/2001 | Aramapakul |
| 6,217,447 | B1 | 4/2001 | Lofink et al. |
| 6,237,917 | B1 | 5/2001 | Timpano |
| 6,254,484 | B1 | 7/2001 | McCrea, Jr. |
| 6,270,404 | B2 | 8/2001 | Sines et al. |
| 6,279,910 | B1 | 8/2001 | de Keller |
| 6,293,864 | B1 | 9/2001 | Romero |
| 6,296,251 | B1 | 10/2001 | Webb |
| 6,299,536 | B1 | 10/2001 | Hill |
| 6,334,613 | B1 | 1/2002 | Yoseloff |
| 6,575,831 | B1 | 6/2003 | Gonen et al. |
| 6,582,302 | B2 | 6/2003 | Romero |
| 6,585,586 | B1 | 7/2003 | Romero |
| 6,626,433 | B2 | 9/2003 | Scibetta |
| 6,805,628 | B2 | 10/2004 | Romero |
| 6,896,614 | B2 | 5/2005 | Romero |
| 2001/0029200 | A1 | 10/2001 | Romero |
| 2002/0002070 | A1 | 1/2002 | Romero |
| 2002/0006820 | A1 | 1/2002 | Romero |
| 2002/0155870 | A1 | 10/2002 | Romero |
| 2006/0089188 | A1 | 4/2006 | Romero |

FOREIGN PATENT DOCUMENTS

| | | | |
|---|---|---|---|
| CN | 1575835 | A | 2/2005 |
| JP | 2005-21652 | A | 1/2005 |
| KR | 1020050003952 | A | 1/2005 |
| MG | 29 | | 10/2006 |
| MO | 1/000120 | | 5/2005 |
| TH | 65388 | | 12/2004 |
| TW | 200502028 | | 1/2005 |
| WO | 1 148 916 | A0 | 10/2001 |
| WO | WO 01/76703 | A1 | 10/2001 |
| ZA | 2002/9015 | | 5/2004 |

BACCARAT GAMING ASSEMBLY

CLAIM OF PRIORITY

The present application is a continuation-in-part application of previously filed, application having Ser. No. 10/047,909 filed on Jan. 15, 2002 now U.S. Pat. No. 6,896,614 which is a continuation-in-part application of previously filed, application having Ser. No. 09/794,307 filed on Feb. 27, 2001 now U.S. Pat. No. 6,805,628, which is a continuation-in-part application previously filed having Ser. No. 09/760,697 filed on Jan. 16, 2001, which matured into U.S. Pat. No. 6,582,302 on Jun. 24, 2003, which is a continuation-in-part application of previously filed application having Ser. No. 09/546,365, filed on Apr. 10, 2000, which matured into U.S. Pat. No. 6,585,586 on Jul. 1, 2003, which is a continuation-in-part application of previously filed application having Ser. No. 09/433,307 filed on Nov. 3, 1999, which matured into U.S. Pat. No. 6,293,864 on Sep. 25, 2001, which are incorporated herein by reference.

BACKGROUND OF THE INVENTION

1. Field of the Invention

This invention relates to a variation of the card game baccarat and assembly for the play thereof which allow for greater user participation in the outcome of the game and/or which include a bonus payout awarded to a participant or user of the assembly in the event of a nine being the winning hand and/or two or more consecutive hands having a total of nine, which defines the best hand achievable in a conventional game of baccarat, thus enhancing the appeal and entertainment potential of the game to the participant or user, while maintaining a house advantage.

2. Description of the Related Art

The word baccarat is derived from the Italian word "baccarat", which means zero. The term refers to the face cards and the ten cards, all of which have a zero value in the conventional game of baccarat. In Europe, baccarat and a similar game or variation of conventional baccarat is called "chemin de fer" and these games are among the most popular casino games.

Since baccarat's introduction in Nevada casinos, the game has assumed an aura of glamour and in most casinos baccarat is played in a designated, at least partially segregated area. The intention is to attract the more sophisticated, monied player or "high roller". However, for all the intrigue and/or mystery surrounding the game of baccarat, which has been significantly enhanced by its depiction in numerous popular "spy movies", baccarat is primarily a very simple game. Normally, but not always, there are no decisions or options for the player to make and generally speaking there is no degree of skill required for either the players or the dealer except in the area of wagering. In most casinos a player may be seated in any open seat at the table and the seating position does not affect the play in any manner. In conventional casino baccarat, the number of players may vary from one through fifteen. Naturally, as in all casino run games, "house rules" dictate and the number of players allowed to concurrently participate in a game of baccarat may be determined by the house and may be smaller or larger than the conventional number fifteen.

During play, each player gets a turn to handle the "shoe", which contains typically six to eight decks of cards and is specifically structured to facilitate the dealing of individual cards in a face down orientation. When a player has the shoe he is designated as the banker, but any player may decline the shoe and allow it to be passed, typically to a player's right, along the line of players. There is no advantage or disadvantage in dealing the cards and it is generally considered a formality which contributes to the game's ambiance, in that most sophisticated players enjoy being active in the dealing. A dealer, who is a representative of the casino, normally does not remove the cards from the shoe, but receives the cards from the banker/player. The dealer places the cards in an appropriate box or section on the playing surface, which is designated for a "player's hand" and a "banker's hand". Each of the plurality of players bet by placing their chips in a designated location on the playing surface, which is accessible to the plurality of players. Each player, except the player designated the banker, may place bets either on the player's hand, the banker's hand or both. The banker must bet on the banker's hand and all bets are paid off at even money. In most casino controlled games betting parameters range from a minimum wager of twenty dollars to a maximum wager of two thousand dollars. After the winner is announced by dealer, additional dealers, when more than one dealer is present at the table, pay off the winning bets and collect the losing bets. If the banker's hand was a winner, all the players wagering on the winning banker hand must pay a commission, typically in the amount of approximately five percent (5%) of their respective winning wagers. Accordingly, if a player had a hundred dollar bet on the banker's hand and won, five dollars would be owed to the house. Rather than collecting the "vigorish" after each game, a record of what is owed by each player is kept in a designated location on the playing surface by one or more dealers. Players then pay the accumulated amount owed to the house or casino after the completion of a shoe. Each time the shoe is depleted of cards, the total amount of cards are thoroughly shuffled and replaced in the shoe. Furthermore, in some variations, restrictions are placed on the banker's ability to immediately add to, remove and/or withdraw their wager after a winning hand. Specifically, once the initial wager is made, the house rule may require that if the first hand is won, a second hand must be played essentially letting the winning wager "ride". After that point the banker can then withdraw all or part of the winning bet amount. Additions to the winning bet can generally be made at any time.

The playing of each game of baccarat typically involves the dealing of two hands by the participant banker/player or by the house when no player accepts the shoe. Before the hands are dealt bets may be placed on either the banker's hand or the player hand at designated areas on the betting portion of the playing surface. In addition some casino's allow the wager on the occurrence of tie between the player's hands and the banker's hand. All bets, if there is a tie, between the banker's and player's hand, are returned. Once a bet has been placed there are no opportunities for the player to make a decision in most casino run games of baccarat. More specifically, the banker's hand and the player's hand are dealt according to fixed rules resulting in final hands of either two or three cards for each.

The value of a hand is determined by adding the values of its individual cards. Tens and face cards are counted as zero, while other cards are counted at their face values. Only the last digit of the total number count of each hand is used so that all baccarat hands have values in the range of zero to nine inclusive. For example, a hand comprised of a six card and a seven card, normally totaling thirteen would only be counted as a total number count of three, since, as set forth above, only the last digit of the total is used as the total number count for any given hand.

A conventional game of baccarat is started by dealing two cards for the player's hand and two cards for the banker's hand, normally in alternate fashion. An initial hand having a total number count of eight or nine is called a "natural". If either hand is a natural its holder must expose it and the game ends. Otherwise the play continues first with the player's hand and subsequently with the banker's hand, according to the rules designated by the individual casino or house. Rules for the player's hand comprise: if the player's first two cards total six or more then the player must stand without drawing a third card; if the player's first two cards total five or less the player must draw an additional one card only. Rules for the banker's hand comprise: if the banker's first two cards total seven or more, the banker must stand without drawing a third card; if the banker's first two cards total zero, one or two, then the banker must draw one card; if the banker's first two cards total three, four, five, or six, then whether the banker draws an additional card is determined by whether the player drew an additional card and if so, the value of the player's additional draw card. The simple objective of conventional, casino baccarat is to draw a two or three card hand that totals closer to nine than the other hand. It is to be remembered that only two hands are dealt; the player's hand and the banker's hand.

In order to increase the interest in baccarat which, as set forth above, normally is surrounded by an air of mystique, a number of casinos have installed smaller more compact baccarat tables and located these smaller or "mini" tables among the black jack tables. So called "mini baccarat" is the same game but is absent certain rituals or formalities, such as passing the shoe etc. The layout of the mini baccarat table, however, generally conforms to the conventional baccarat table but frequently contains a lesser number of player positions. In addition, betting parameters usually range from a two to five dollar minimum up to a five hundred dollar maximum. Mini baccarat is a fast paced game but, as set forth above, the same rules apply as in conventional baccarat.

Even though baccarat, either in its conventional form or its "mini" form, is considered a fast paced game, certain variations, at least in the apparatus, such as playing tables etc. with which it is played, have been introduced. Such variations have been attempted in order to increase the attractiveness of the game to players. Baccarat, possibly due to its simplicity, has generally been devoid of any "unconventional" variations in the method of play, which may be normally accepted by other casino card games, such as black jack or twenty one. More specifically the implementation of "progressive payouts" also found in a variety of other casino card games has not been applied to the conventional game of baccarat.

Therefore even though baccarat, particularly as played in casinos in both the United States and Europe, enjoys a great popularity with players, there is still a need for a variation of the method of play. In addition, an assembly or apparatus specifically designed to play baccarat, either in its conventional form and/or in a modified or varied version thereof, is also a desired improvement in order to increase the popularity of the game, while at the same time maintaining a fast rate of play and significantly large payouts.

Additionally, it is recognized that there is an ever increasing popularity in the field of automated or computer variants of games. For example, in addition to traditional slot machines, casinos also often include other automated games such as computer poker or blackjack which attract large numbers of players and provide very attractive returns to the house. As such, it would be beneficial to provide an increased exposure to baccarat through the development an enjoyable automated game. Moreover, it is recognized that based upon the often strict rules of the game of baccarat with regard to whether a card is drawn or not drawn on certain hands, it would be beneficial to provide such an automated game which actually promotes the development of strategy and decision making by the player so as to directly affect the outcome of the game. Also, it would be beneficial to provide such a variant to include facilities for providing increased payouts to the players under certain play circumstances.

SUMMARY OF THE INVENTION

The present invention is directed towards a baccarat gaming assembly structured to facilitate the play of a variation of the card game baccarat. Moreover, in one embodiment the variation may be appropriately termed "baccarat plus" in that at least one of a possible plurality of participants or users may have the option of participating in a bonus payout which may be increased in accordance with a preset schedule or rate, or alternatively which may be increased randomly, such as based upon the total number count of at least two consecutive hands.

Looking to the first, illustrated embodiment, the present invention includes a baccarat gaming assembly that is preferably automated so as to make the game of baccarat more accessible to the gaming public. To this end, the baccarat gaming assembly includes at least one computer processor, at least one associated display, and an input having a user actuatable selector. In particular, the display allows the user to readily see the progress of the game in a manner simulating a conventional game, while the actuatable selector assembly allows the user to make any necessary decisions.

Looking to the computer processor assembly, it is structured to generate a player's hand and a banker's hand in accordance with rules of baccarat. Moreover, the computer processor assembly is also preferably structured to permit the user either before or after dealing the hands, to elect whether their user hand is the player's hand or the banker's hand. As a result, the user may play hunches and the like to decide which hand to play. Once the hands have been designated accordingly, the computer processor assembly is further structured to add cards to the player hand and the banker hand in accordance with the conventional rules of the card game baccarat, ultimately identifying one of the hands as a winning hand. Naturally, if the wining hand is the user hand, the user is designated a winner and a corresponding payout is made. So as to further enhance the playing experience, however, the computer processor assembly is further preferably structured to keep track of consecutive user's hands, and to indicate a bonus payout to be paid to the user if a predetermined number count of nine occurs in at least two consecutive ones of the user's hands. Alternately or additionally, the bonus payout may be provided merely if one, or preferably the user's hand merely totals nine. In such an embodiment the increased bonus payout may also be provided for consecutive hands totaling nine.

Further, in yet another embodiment, the computer processor may deal one or both of the initial hands with one visible card and one covered card. In such an embodiment, the computer processor is responsive to a user input and will selectively replace the initially visible card of either one or both hands. Furthermore, the computer processor may be programmed to be responsive to the user input, either before or after the user has elected whether to play the bank hand or the player hand. As such, the user can not only maximize their opportunity to win the hand, but also can maximize their opportunity to have a number count of nine on one or both hands.

From the preceding system, it is noted that the present invention may also include a method of playing baccarat, which may be achieved manually and/or through some automated means. As in conventional baccarat, only a player's hand and a banker's hand is dealt and the plurality of participants each have the option, with the exception of the participant designated as the banker, of placing a wager on either the player's hand or the banker's hand or both. Under the rules established by certain casinos the plurality of participants may also bet on the occurrence of a tie between the player's hand and the banker's hand, but such modified rule changes do not significantly affect the variation of the method of play of "baccarat plus" of the present invention, as set forth in greater detail hereinafter.

Alternately, the present invention may relate to a method of play that comprises, in many aspects and embodiments, the play of a conventional game of baccarat, wherein each game of baccarat, as described hereinafter is meant to comprise the dealing of a player's hand and a banker's hand. More specifically, at the start of play the casino announces or designates a bonus payout. The bonus payout either can be in the form of a dollar amount and/or an odds payout, such as two to one, three to one, four to one, etc. Among the plurality of participants in the card game, a "banker" may typically be chosen. The "banker/player", hereinafter termed banker, is determined in accordance with conventional method of play in that the banker is defined by the player offered and accepting the shoe and attending to the physical dispensing of the cards from the shoe. Naturally, any participant may pass his turn at the shoe wherein the shoe is passed to the right successively to each player until a participant is found which will accept the shoe and become the banker. Prior to dealing the cards, the banker and/or any of the participants may be given the opportunity of making a bonus wager in addition to or as part of a normal primary wager. The primary wager, in typical fashion, is made so as to participate in the next game of baccarat and the bonus wager allows the participant the possibility of collecting the bonus payout, which, as determined by the casino or house may be either a dollar amount or an odds amount. In either event the participant may or may not be required to make a bonus wager, and play continues in the manner of a conventional baccarat game.

In particular, a player's hand and a banker's hand are dealt in the conventional fashion. After the hands are dealt, the dealer, in the case of a live versus automated game, being a representative of the casino, immediately announces the existence of a natural, which is defined as the existence of a total number count in either the player's hand or the banker's hand of an eight or a nine occurring in the first two cards of each hand are dealt. Naturally, different number totals could be equivalently designated, if desired. If a natural does not occur, play continues in accordance with the conventional game of baccarat to the extent of determining when and if either the player's hand and/or the banker's hand receives an additional third card. It is to be emphasized that rules governing the acceptance of a third card is generally not the decision of the individual player, but rather predetermined in accordance with the rules set forth by the casino.

Play again proceeds in the determining of a winner between the player's hand and the banker's hand by which hand has a total number count closer to nine. The total number count of nine is the best hand capable of being accomplished in the conventional play of the game of baccarat. As an alternative to winning or losing, the player's hand and the banker's hand may tie by having the same total number count. Also, the participant designated the banker and accepting responsibility for the shoe and the distribution of cards therefrom maintains the banker status until the banker's hand becomes the losing hand in any given baccarat game. As long as the banker's hand beats or ties the player's hand (has a total number count closer to nine or equal to that of the player's hand), the banker remains the banker and controls the shoe. The determination of the banker among the plurality of participants concurrently participating may be important in that, in one embodiment of the present invention, only the banker and/or a limited number of players may be allowed the opportunity of making a bonus wager and thereby participating in the possibility of collecting the bonus payout.

As set forth above, the best hand possible to obtain in the conventional game of baccarat is the occurrence of a total number count of either a player's hand or a banker's hand equaling nine, and as such does not occur during a majority of hands. In addition, while the occurrence of the total number of count of nine in consecutive hands is not a normal happening, it does occur and is the basis of one embodiment of "baccarat plus" or a variation of the conventional game of baccarat of the present invention, which greatly rewards at least the banker, in terms of being able to collect the bonus payout set by the casino. More specifically, a participant who has previously made a bonus wager, or is otherwise eligible for the bonus payout, of a preset or agreed upon amount, will collect the bonus payout, also established by the casino, if the total number count of each of at least two consecutive hands, played in consecutive baccarat games, are equal to a predetermined number count set by the casino. As emphasized above the best possible hand is a total number count of nine. Accordingly in one embodiment of the present invention the predetermined number count would be equal to nine. When nine is established as being the predetermined number count, the occurrence of a natural nine (ten or face card plus a nine card) or a broken nine (seven and two, six and three, four and five) may meet the requirement for consecutive hands of equal number count. Naturally the casino, for whatever reason, could establish a different predetermined number count for awarding consecutively occurring banker's hands. Also, in certain additional embodiments of the present invention, more than one number could be established by the casino, wherein consecutive hands could have a number count equal to either of the previously established predetermined numbers. Furthermore in a further embodiment of the present invention a bonus payout, such as in the form of an added payout or an increased winner payout may be made merely if either one of the hands totals nine, or if the participant's hand totals nine, or if a hand wagered upon totals nine, or another designated number count. As a result, the benefit to a win may be increased if the win comes with a number count of nine. Furthermore, although it is preferred that all of the consecutive hands having a total of nine be the participant's hands, it may be desirable to provide for any combination of hands totaling nine or a natural nine. In the case of the consecutive hands totaling nine the bonus payout is preferably increased.

If a bonus wager is required and the participant's hand loses or no nine results, he would lose his primary wager as well as the bonus wager. In the event the banker continues to receive winning hands in successive baccarat games, he would of course continue to collect his primary wager, less any amount of commission normally payable to the casino, and would continue to be eligible for participation in the collection of the bonus payout for consecutive hands totaling nine. Once the banker receives a losing hand, he is no longer designated the banker and relinquishes control of the shoe and the disbursement of the cards therefrom, as set forth above.

Other embodiments of the present invention include an automatic mode of play wherein the bonus wager is subtracted from the primary wager, and the primary wager must be sufficiently large to have the bonus wager deducted therefrom. Deduction of the bonus wager may occur at the end of each successive baccarat game, whether the participant's hand is a winning hand, tieing hand or losing hand. Furthermore, it is recognized that in the case of multiple participants, the participant who is not the actual banker/player must select a hand, making that their participant's hand on which they are eligible to win a normal and/or bonus payout, depending upon the embodiment.

In a manual mode of play the participant makes a primary wager and makes a separate, independent bonus wager, which is paid directly to the dealer as a representative of the casino and/or placed on a designated portion of the playing surface of conventional or specialized apparatus, to be described in greater detail hereinafter. In a random mode of play of the present invention, the participant makes a primary wager to participate in the next baccarat game and makes an independent bonus wager, paid to the dealer or other casino representative directly and/or positioned on a designated, predetermined portion of the playing surface, as set forth above. However, an increase in the bonus payout may occur on a random basis, determined by any established rules or regiments set forth by the casino, in order to further reward the winner for participating in the bonus portion of the playing method and for achieving more than two consecutive hands of equal number count.

Naturally, the occurrence of three, four, five or even more consecutive hands, each of which include a total number count equal to a predetermined number count or the best hand number count of nine, is increasingly difficult and defies the odds on an increasingly greater basis. Accordingly the participant will be rewarded by a proportionally increased bonus payout in the event of the occurrence of more than two consecutive hands, each having a total number count equal to the predetermined number count, generally nine. In such a case, it may be preferred to only allow one participant, such as the active player/banker to win the increased bonus payout associated with consecutive hands totaling nine, however, if desired, a smaller increased payout or pool could be provided to be shared by all participants.

Other features of the method of playing the variation of a conventional game of the baccarat, herein termed "baccarat plus" are as follows:

The banker may at any time increase his wager on the banker's hand and also may withdraw half, or some amount less than half, of his wager after the second winning hand has occurred. Further, a banker can participate in the bonus wager/bonus payout any time if he/she has not done so beginning at the play of the first game of baccarat. Also, the banker can withdraw at any time, even when the first winning hand is a tie, wherein all primary wagers are returned. In this event the shoe is awarded to the next player on the right of the banker that is willing to cover at least the value of the original banker's primary wager after deducting any bonus wager, as set forth above.

As will be further described in greater detail hereinafter, wagers are made by each of the players, by placing their chips on a designated portion of the playing surface so as to clearly indicate whether a given player is playing with the player's hand or the banker's hand. Chips may be placed on certain lines indicating that only of a portion of the indicated bet is to be a wager and the entire amount is to be indicated as contributing to the "auction" for buying the shoe. Persons standing by the table on which the playing surface is mounted may or may not be able to participate in the conventional game of baccarat as determined by the casino or house.

It is further to be emphasized that the casino or house controls all the rules and regulations concerning the play of a given game, including conventional baccarat or the variation of baccarat, as set forth herein. Therefore minor rule modifications may be made in the method of play of the subject invention, without departing from the intended spirit and scope of the present invention, wherein such deviations from conventional rules are well within the purview of the casino or house.

While the method of this variation of the card game of baccarat, as described herein, may be played without specific playing structure or specialized apparatus, the modified game and its method of play is particularly facilitated by an assembly specifically configured to play "baccarat plus" and on which other card games, including but not limited to conventional baccarat may be played. Such an assembly comprises a playing surface having a plurality of player areas designating a preferred location for individual ones of a preset number of players. The playing surface also includes a betting area. Each of the player areas includes a card positioning section, wherein at least two cards are intended to be positioned, eventually in a face up orientation, so that the two cards may be readily observed, particularly when a player located at a specified player area is designated as the banker.

The playing assembly of the manual embodiments of the present invention also preferably include a camera assembly having at least one but preferably a plurality of cameras each of which are disposed and structured for viewing one of the plurality of player areas and in particular the card positioning section thereof. The display assembly, whether comprising one or more cameras, is particularly structured to establish a clear viewing of the card positioning section and incorporates or is electrically connected to an optical scanning device specifically structured to determine the total number count of at least one card but preferably of at least two cards disposed in a face up orientation on the card positioning section. Since at least theoretically, each of the succeeding players located or positioned about the perimeter of a playing surface will eventually be designated as the banker, the camera assembly should be structured to be able to view and, in combination with the optical scanner, electronically determine the total number count of at least the first two cards of each of the player's hands at least when they are designated the banker.

The playing assembly further comprises a display assembly mounted adjacent to the playing surface at a location where at least all of the players and preferably all of the one or more dealers representing the casino, can clearly view the display, electronically produced on the display assembly. The camera assembly and the display assembly are electrically coupled or connected in circuit with the aforementioned optical scanning device, such that when the optical scanning device recognizes a total number count of a banker's hand being equal to the predetermined number count associated with the bonus payout, the display indicates, by way of example, the existence of a natural nine, broken nine, the position of the player designated as the banker, as well as the number of consecutive banker's hands which are each equal to the predetermined number. The optical scanner, in combination with a central processing unit can be programmed to recognize any of a plurality of numbers, zero to nine, as the predetermined number count and/or recognize total number counts of a player's or a banker's hand, which is not equal to the predetermine number, in order that the display assembly can indicate that no consecutive hands have been established with the predetermined total number count. The playing assembly may include other features such as one or more speakers located on the playing surface, such that each of the players may be independently informed of certain aspects of the play of the game or collectively so informed by an announcement either electronically or manually as desired.

These and other features of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

As shown in the accompanying Figures, the present invention is directed towards a method and playing assembly or apparatus designed to play a variation of the card of baccarat, wherein one feature of the present invention includes the ability of the player/participant designated as banker or any other game participant to participate in a bonus payout in the event of certain occurrences relating to the total number count of the hands, and especially of consecutive hands, and the implementation of an automated gaming assembly which makes the game of baccarat more available to players, more fun and entertaining for play, and can integrate the bonus payout method of the present invention.

Figure 1:
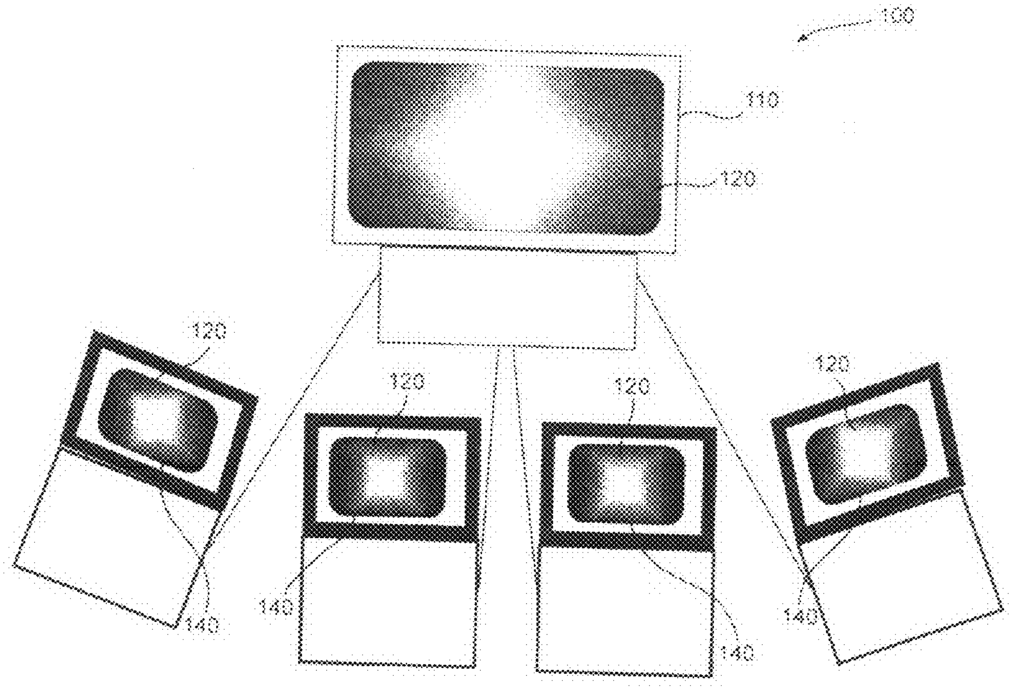
FIG. 1 is a schematic illustration of one embodiment of the baccarat gaming assembly of the present invention.

Before looking to the preferred, automated embodiment of the present invention, we first elaborate on one or more methods of playing the subject variation of the card game baccarat, herein in termed "baccarat plus", it being understood that it could be conducted on a variety of playing surfaces, and as will be described with regard to the embodiments of FIGS. 1 and 8, as an automated game on one or more gaming machine. In order to facilitate the playing of the "baccarat plus" variation, in a more conventional playing card manner, FIGS. 1A through 4 show an assembly generally indicated as 10 including a playing surface generally indicated as 12, specifically designed for playing of "baccarat plus" but as will be apparent hereinafter, is adaptable for the playing of a variety of other card games. The playing surface 12 includes a plurality of consecutively arranged player areas 14, the number of which may vary depending upon house or casino rules. Each of the player areas 14 is numbered consecutively as one through nine and at least partially surround a betting or wagering surface 16. The wagering surface 16 preferably includes an elongated, somewhat curvilinear or U-shaped betting area or section 18 accessible to all of the player areas 14 and designated to receive chips representing wagers on a player's hand. Similarly the wagering surface area 16 may include a plurality of consecutive numerals, equal on numbers to the number of playing areas and indicated as 20. The wagering surface portion 20 is reserved and designated to receive chips from each of the various players who wish to wager that the banker's hand will be the winning hand of any given baccarat game. An indentation generally indicated as 22 may be provided and represents a dealer position, wherein the dealer is a representative of the casino or house and has certain specified duties during, before and after the playing of the individual hands.

Figure 2:
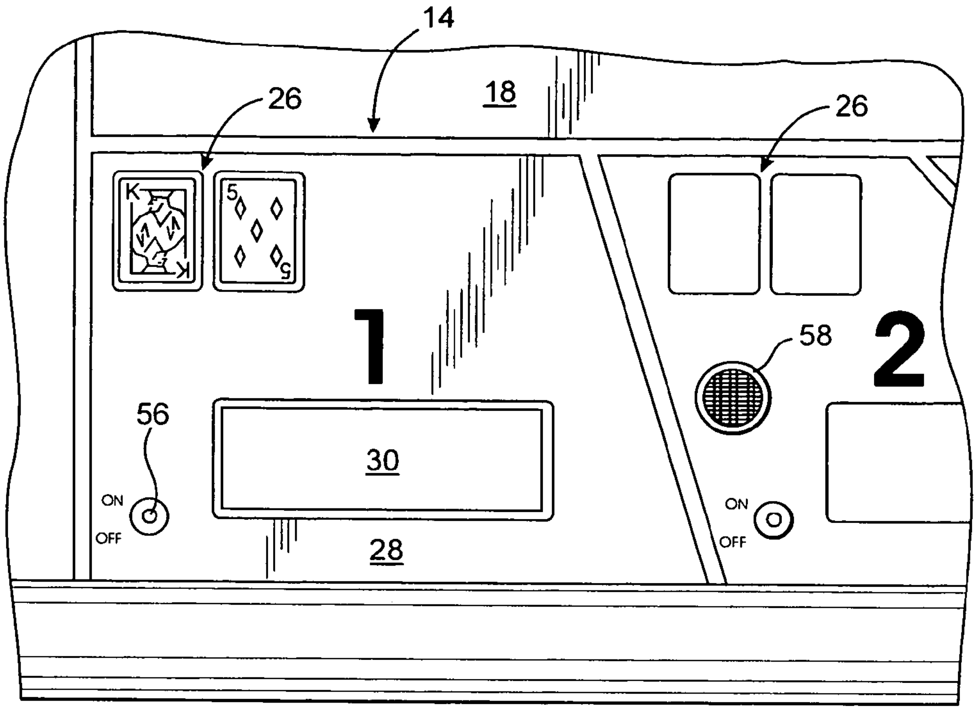
FIG. 2 is a detailed view of a portion of the playing surface of the embodiment of the assembly shown in FIG. 1A.

With reference to FIG. 2, each of the player areas 14 includes a card positioning section generally indicated as 26 and clearly has segments designated for the placements of two cards, eventually in a face up orientation as shown. In addition the player areas 14 may have a designated section or area 28 for the placement of a shoe 30. The shoe 30, as in conventional baccarat, is designed to hold a plurality of decks of cards, generally ranging from six to eight such decks. Further, the shoe 30 is structured to deal or dispense individual cards, one at a time, from the shoe for the creation of player's hand and the banker's hand. As in conventional baccarat, and as set forth above, each of a plurality of games of baccarat is preferably defined by a single player's hand and a single banker's hand.

Again with reference to FIGS. 1A through 3, the present invention further comprises a sensor assembly, preferably in the form of camera assembly generally indicated as 32. The camera assembly 32, which may be in the form of a dome-like structure 34 that holds at least one but preferably a plurality individual cameras, each disposed and structured to view individual ones of the player areas 14, generally, and the respective card positioning sections 26 specifically. The camera assembly 32 may be located at a variety of different locations but should be positioned so as to facilitate the individual viewing of each of the player areas 14, in that it is contemplated that each of the players in the consecutively disposed player areas 14, may eventually be designated the banker. Moreover, it is recognized that alternate sensor assemblies may be provided so as to identify the cards dealt, however, other sensor assemblies, such as a scanner built into the table, may require some form of "marking" of the cards so as to be identifiable by the sensor assembly, and any form of "marking" is generally undesirable in the gaming industry. Of course, other indicators incorporated into the face of the cards and structured to be recognized by the sensor assembly may also be utilized and the aforementioned camera may include a visual sensor that identifies the marking on the face of the card, but which for the purposes of this invention may also be deemed a camera assembly as it visually reads a face of the card.

Figure 1A:
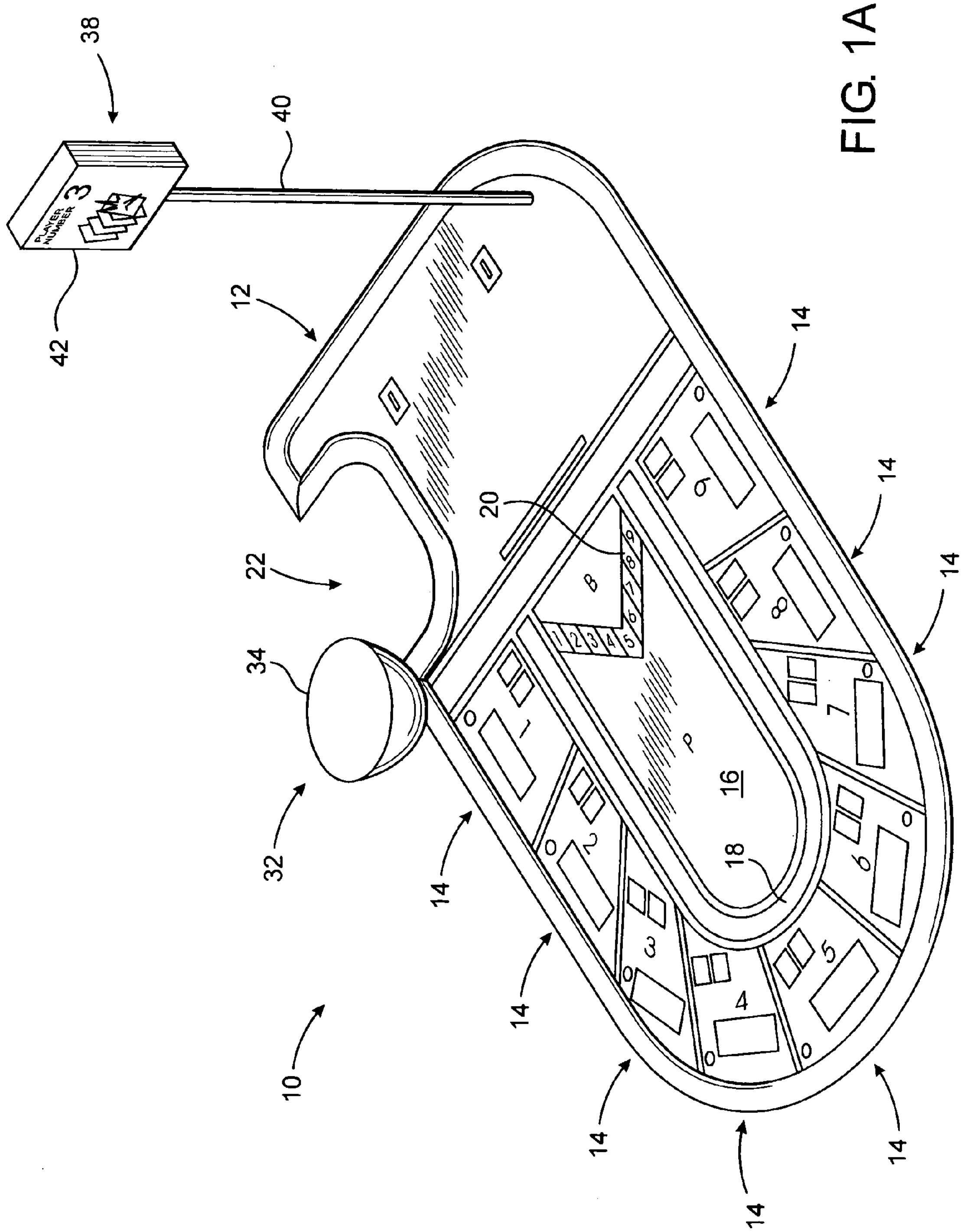
FIG. 1A is a perspective view of an assembly designed to facilitate the playing of a variation of the card game baccarat in accordance with method of the present invention.
Figure 3:
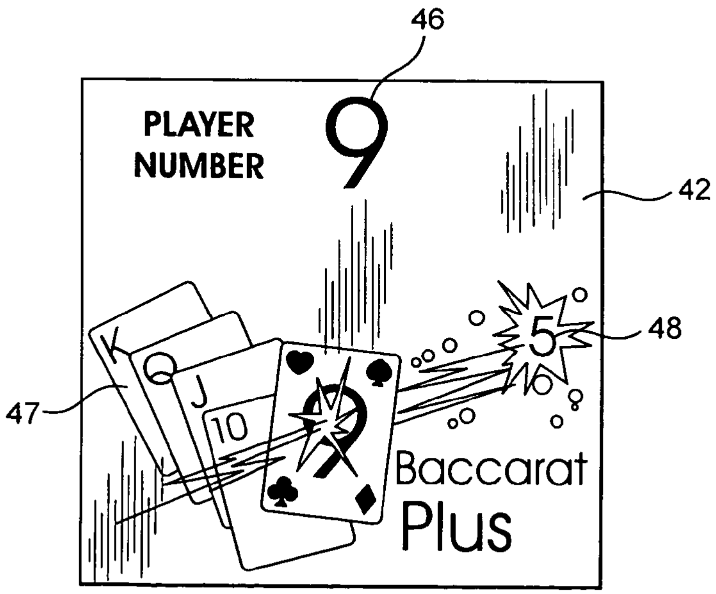
FIG. 3 is a detailed view of an exposed surface of a display assembly also associated with the embodiment of the assembly of FIG. 1A.
Figure 4:
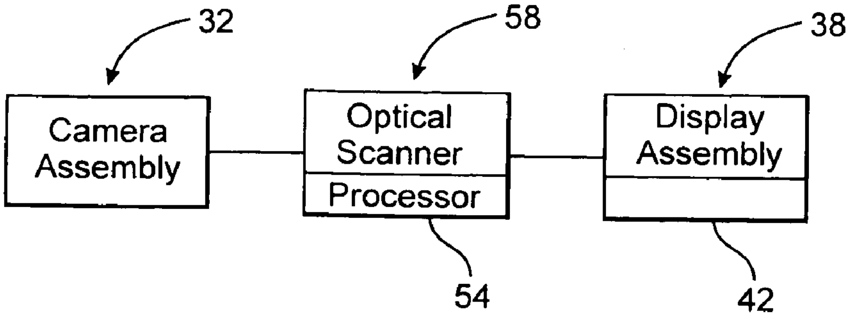
FIG. 4 is a schematic representation in block form of certain operative components of the embodiment of FIGS. 1A through 3.

As in conventional baccarat, the player/participant having possession of the shoe 30 and being in charge of physically distributing cards therefrom is designated the banker. As best shown in FIGS. 1A, 3 and 4, the playing assembly and/or apparatus of the present invention further comprises a display assembly generally indicated as 38 which may be mounted adjacent the playing surface 12, such as on an elongated standard as at 40 which positions a display portion 42 above the playing surface 12. The display portion 42 should be in clear site of at least all of the players located at the various playing areas 14 and preferably by the one or more dealers located at least at the dealer position 22. As shown in FIG. 3 the display portion 42 is structured to display the location of the player area, designated as the banker, such as by indicating a numeral, as at 46, representing one of the player areas 14. Similarly, a visual display in the form of a logo 47 may also be displayed on the display portion 42. The plus designation area, as at 48, will represent a plurality of numerals, generally one through five, wherein such numerals indicate the consecutive number of hands of the banker which have the same total number count and more specifically wherein each of the consecutive hands have the same number count as a predetermined number count designated by the casino, as will be explained in greater detail hereinafter.

The camera assembly 32 and the display assembly 38 are electrically interconnected to one another as well as to an optical scanner 52 as schematically represented in FIG. 4. As set forth above, the optical scanner 52 is connected to both the camera assembly 32 and the display assembly 38 and is specifically structured and/or programmed, with the provision of a processor 54, to optically scan and/or electronically read the number count of at least one but preferably the total number count of the number of cards located in the card positioning section 26 of the specific player area 14 determined as being the banker. The electronic reading or optical scanning by the optical scanner 52 occurs by virtue of its connection to the one or more cameras of the cameras assembly 32 viewing the cards located at the card positioning section 26. Once the optical scanner 52 determines that the total number count of at least one or preferably two consecutive banker's hand is equal to a predetermined number count, the display portion 42 will begin to continuously register and display the number of consecutive hands. Once the consecutive number of hands is discontinued, the optical scanner will immediately determine such discontinuance, and the designated number 48 will revert back to zero or will go blank, as programmed, after indicating a plus payout is to be made.

In addition to the above, the assembly 10 further includes a switching assembly preferably comprising a plurality of individual switch structures 56 located at each of the plurality of playing areas 14. Each of the switching structure 56 is interconnected to the camera assembly 32, the optical scanner 52 as well as the display assembly 38, for purposes of activating the system. As will be explained in greater detail hereinafter, activation of the system, in terms of monitoring the number of consecutive banker's hands which have a total number count equal to the predetermined number count set by the casino, can only occur once the banker determines to make a "bonus wager". This indicates the banker's intent to participate in the possibility of collecting a "bonus payout". The making of the "bonus wager" is done as part of or in addition to the primary wager made by the banker to participate in each of the plurality of baccarat games.

The assembly as shown in FIGS. 1A through 3 also includes a plurality of speakers 58, wherein the plurality of speakers 58 may be located at various positions around the playing surface, such that each of the players, regardless of their location can easily hear any announcement made by the house and/or the dealer either manually or electronically.

Also with regard to the preceding structure, it is recognized that it could be implemented with a variety of other casino games, such as blackjack, the sensor assembly and display identifying the occurrence of one or more blackjack hands for either a normal payout and/or an additional payout at one or more player positions.

Figure 5:
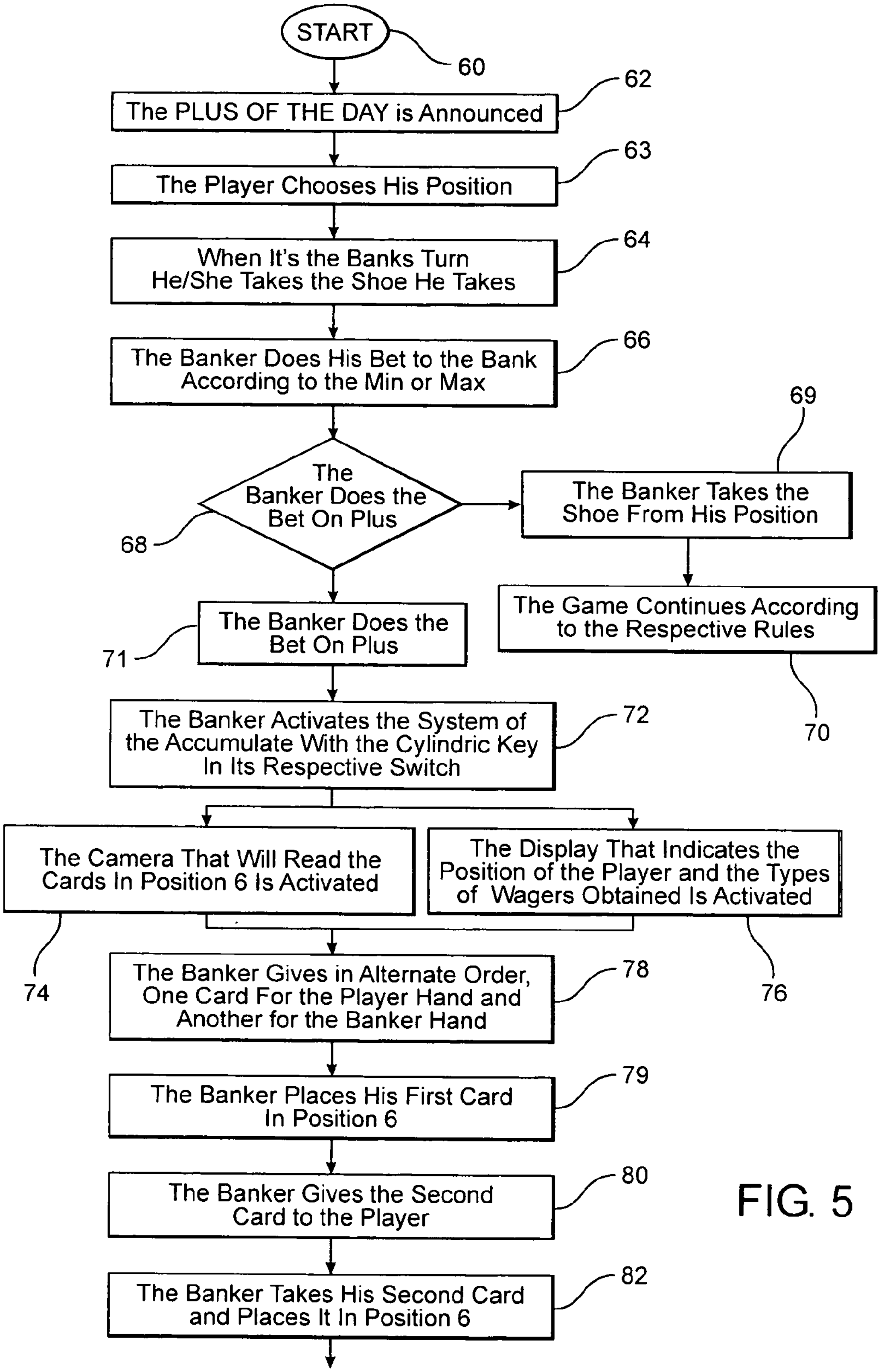
FIG. 5 is a portion of a flow chart schematically representing the various step of the method playing the variation of the card game baccarat in accordance with the present invention.
Figure 5A:
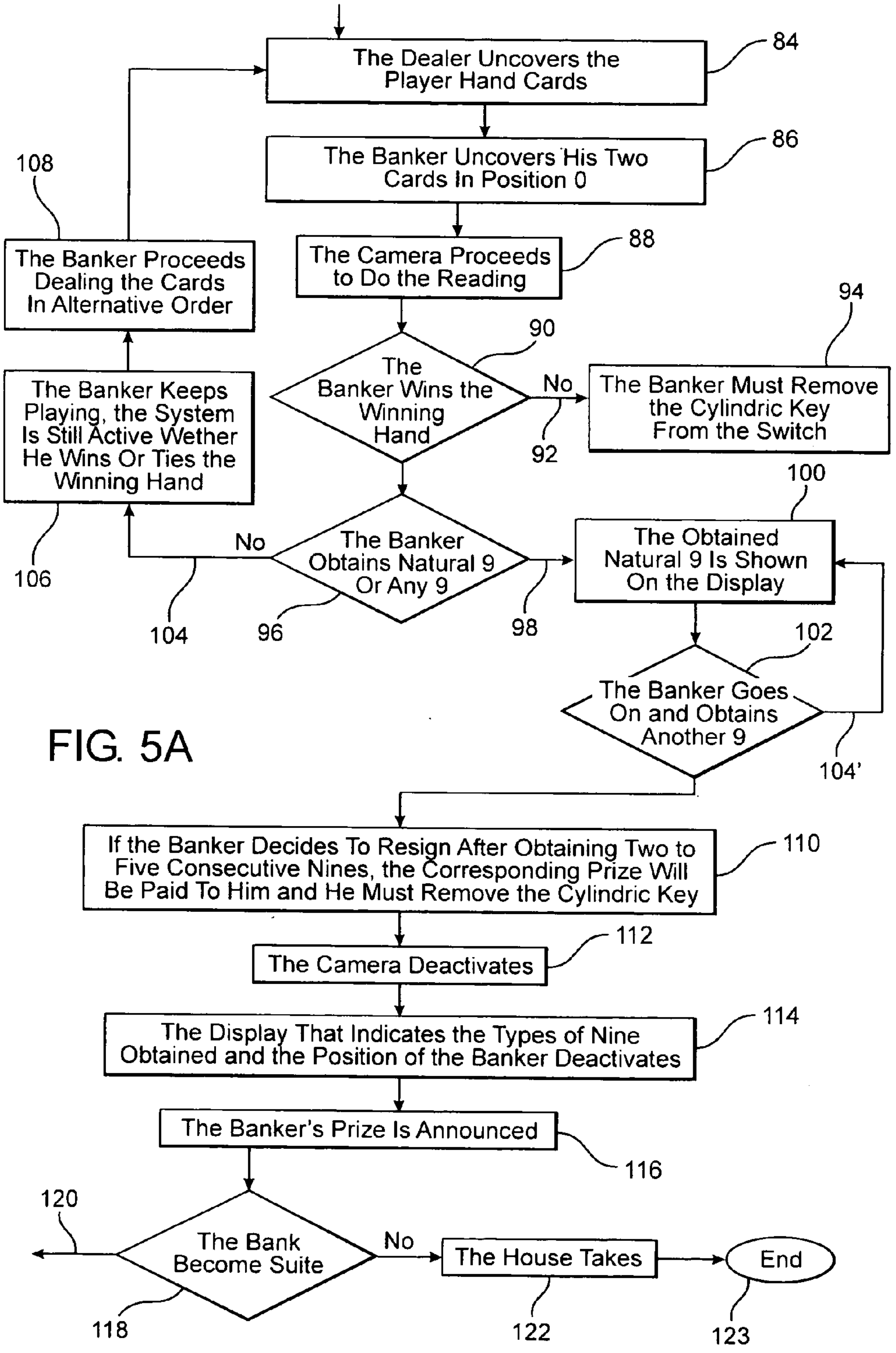
FIG. 5A is a continuation of the flow chart shown in FIG. 5.

Turning to FIGS. 5 and 5A, one embodiment of the method of playing the variation "baccarat plus" involves the start of the game, as at 60, and the casino or house, either before, simultaneously, or after, announcing the amount of a "bonus payout" as at 62. Each of the plurality of players then chooses any one the open player areas 14 as at 63, at which he desires to be located. An individual one of the plurality of players is designated as the banker by that player accepting the responsibility of the shoe 30, as at 64, as well as preferably the physical distribution of the cards which form the player's hand and the banker's hand of each of a plurality of baccarat games which are successively played, until the shoe is depleted. The player designated the banker makes a primary wager as at 66 in order to participate in each of the successive baccarat games. The banker then makes the decision, as at 68, as to whether or not to participate in "baccarat plus" and thereby possibly collect the bonus payout announced by the casino or house as at 62, described above. If the banker does not desire to participate in the "baccarat plus" variation, the successive games of baccarat continue under the normal rules of baccarat as at 69 and 70. However, if the banker does determine that he wishes to participate in the "baccarat plus" variation the banker then decides as at 68 to make a bonus wager as at 70. Immediately thereafter, in one embodiment the banker activates the switching assembly by "turning on" a corresponding one of the switch structures 56 located at his player area 14. In such an embodiment, each of the switch structures, in order to avoid inadvertent activation of the system, may be operated by a turn key presented to the banker once he determines that he wishes to participate in "baccarat plus". Of course, other modes of indication of such participation and/or activation of the system, such as by the dealer, may also be provided. The activation of the switch structure 56 will serve to activate both the camera assembly 32 and the display assembly 38 in the manner set forth above and will further activate the optical scanner 52, so as to electronically read and/or optically scan the respective card positioning section 26 located at the players area 14 where the banker is positioned. Such designated player area would be indicated on the display surface 42, as at 46, by an appropriate number designation, as described above. Accordingly, and again with reference to FIG. 5, the camera assembly 32 will preferably begin monitoring the cards, with the aid of the optical scanner 52, as at 74. As set forth above, the display 42 will represent the designated banker/player as at 76.

The banker as at 78 begins dealing the card in a conventional, alternate fashion to form both the player's hand and the banker's hand. More specifically, the banker places his first card in the proper player section 26, as at 79, in order to define the first card of the banker's hand, and immediately thereafter the banker, as at 80 delivers the first card of the player's hand. As represented at 82, the banker deals a second card representing the second card to both the banker and player. With reference to FIG. 5A, the dealer then uncovers the cards representative of the player's hand as at 84. The banker as at 86 uncovers the cards representative of the banker's hand and the camera assembly 32 proceeds to read the cards oriented in the card positioning section 26 as shown in FIG. 2, being representative of the banker's hand.

The decision is then made as to the winning hand as at 90. If the banker's hand is not the winning hand as at 92, the banker loses his primary wager and bonus wager. In addition, the banker or dealer then deactivates system by removing his switch key or any other apparatus or device from a corresponding switch structure 56 as at 94. However, if the banker's hand is the winning hand as at 96, either before, simultaneously or after, it is determined if the banker's hand is a natural nine, which for purposes of the method of play herein is defined as the predetermined number count set by the casino as the total number count must be reached by each of the consecutive banker's hands in order to collect the bonus payout. As set forth above, the casino or house may designate other numbers instead of or in addition to the number nine. However, due to the fact that the total number count nine is the best possible hand in the game of baccarat, no other number would be as practical or feasible in defining the predetermined number count, in that the banker's hand must be a winning or tying hand, in order to continue play.

If it is determined as at 98, that the banker's hand is a nine, including either a natural nine or a broken nine, the banker's hand wins the conventional game and a next game of baccarat will be played in the same manner as stated above. Although the bonus wager may be designated as immediately lost if a natural nine does not result, in alternate embodiments, if the banker wins or if the banker's hands has a total number count equal to the predetermined number count of nine, either natural or not, no additional bonus wager need be placed in order to continue to be eligible for the collection of the bonus payout, as set forth above, and/or a bonus payout in the form of an increase to the amount won by the winning hand may be made. The banker as at 102 continues to play successive hands. If, in the preferred embodiment, the initial hand was a natural nine and the next consecutive banker's hand is also equal to a natural nine, as at 104, it is designated as a winner and will collect at least a minimal portion of the bonus payout awarded for the consecutive hands totaling nine. The banker continues playing successive baccarat games hoping to achieve additional, consecutive bankers hands which equal nine. However, the establishment of at least two consecutive hands, such as the banker's hands in the preferred embodiment, each having a total number count of nine, designates the participant, such as the banker as winning or collecting at least a minimal portion of the bonus payout. Depending upon the house preference, either a natural nine or any hand totaling nine may be designating as eligible for the bonus payout.

If the banker, as at 104, or the hand selected by the participant, does not receive a natural nine, or a total number count equal to the predetermine number count set by the casino, the banker keeps playing as long as he wins the baccarat game or ties the player hand for any given baccarat game as at 106. The banker continues to deal from the shoe and is still designated as the banker as at 108. The players bet again with the method of play indicated as at 84 continuing consecutively thereafter.

In event the banker decides to resign after achieving two or more consecutive hands having the same number count, equal to the number nine as at 110, he de-activates the system by removing his switch key from the individual one of the switch structures 56. This causes the deactivation of the camera assembly 32 as at 112, wherein the final display of the display portion 42 indicates the total number of consecutive hands established by the banker as at 114. The dealer or the house announces to the individual players, such as through the various speakers 58, the amount of the bonus payout to be collected by the banker as at 116. The bank becomes a "suite" and another player is attempted to be designated as the banker as at 120. If no banker accepts the shoe, the house takes the shoe as at 122 and the game continues until the end as at 123.

It should be recognized that once a banker has achieved a consecutive number of the designated number total, which in the illustrated embodiment is a natural nine, the bonus payout is preferably guaranteed to the banker, whether or not he/she continues as the banker or later loses a hand. Along these lines, if the person continues as the banker, it is possible that the bonus payout can be pulled out in favor of none or a new bonus wager, the entire amount can be the new bonus wager, or the amount won can designate a minimum that may be surpassed by a future greater number of consecutive bonus hands so as to increase the minimum amount guaranteed.

The embodiment of the method of playing the variation "baccarat plus" as described above is represented as the "manual mode" of play and is indicated in FIGS. 5 and 5A. A somewhat different embodiment is disclosed in FIG. 6 and 6A and is herein represented as the "automatic mode". The automatic mode differs from the manual mode at least to the extent that when the banker decides to participate in the "baccarat plus" variation and determines that he wishes a chance at collecting the announced "bonus payout" as at 62, he designates an amount of his bonus wager as at 66 but does not physically pay a separate or independent wager to the house. To the contrary the designated amount of the banker's wager is included within the primary wager as at 66 in FIG. 6. Accordingly, as the game proceeds, and in the event it is determined as at 92 that the banker's hand is not the winning hand, the dealer then deducts, as at 93 in FIG. 6A, the indicated amount of the bonus wager from the primary wager indicated as at 66 in FIG. 6, rather than collecting an independent bonus wager amount as in the embodiment of FIGS. 5 and 5A. Once the banker loses and subsequent to the bonus wager being deducted, the banker or dealer deactivates the system by manipulating the switch key as at 94. The consecutive or plurality of games of baccarat continue with the same banker, if the banker's hand was a winning or tying hand as at 90. The casino designates a new banker as indicated in the remaining portion of FIG. 6A if the banker's hand loses.

Figure 6:
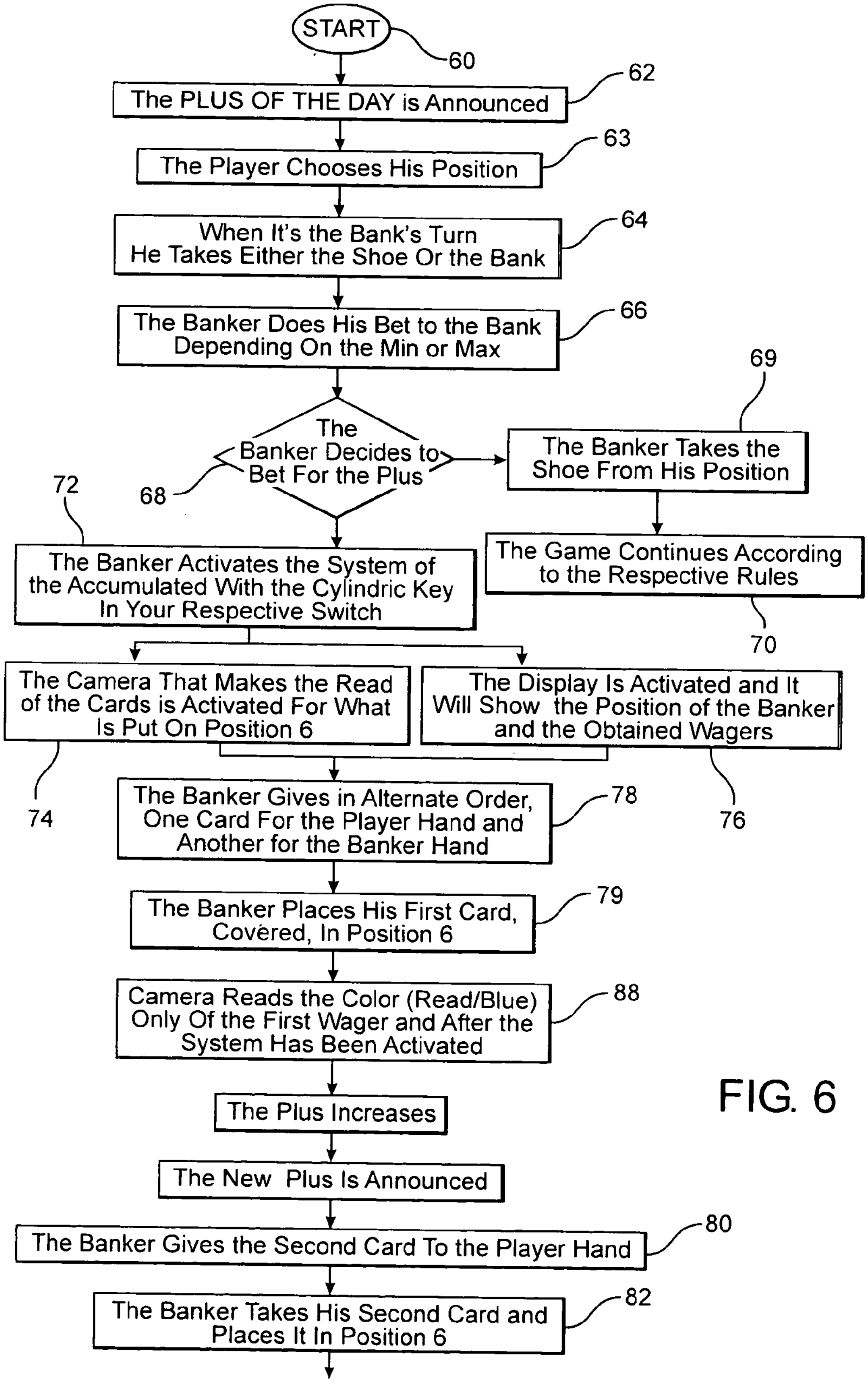
FIG. 6 is a part of a flow chart schematically representing another embodiment of the method of playing a variation of the card game baccarat in accordance with the present invention.
Figure 6A:
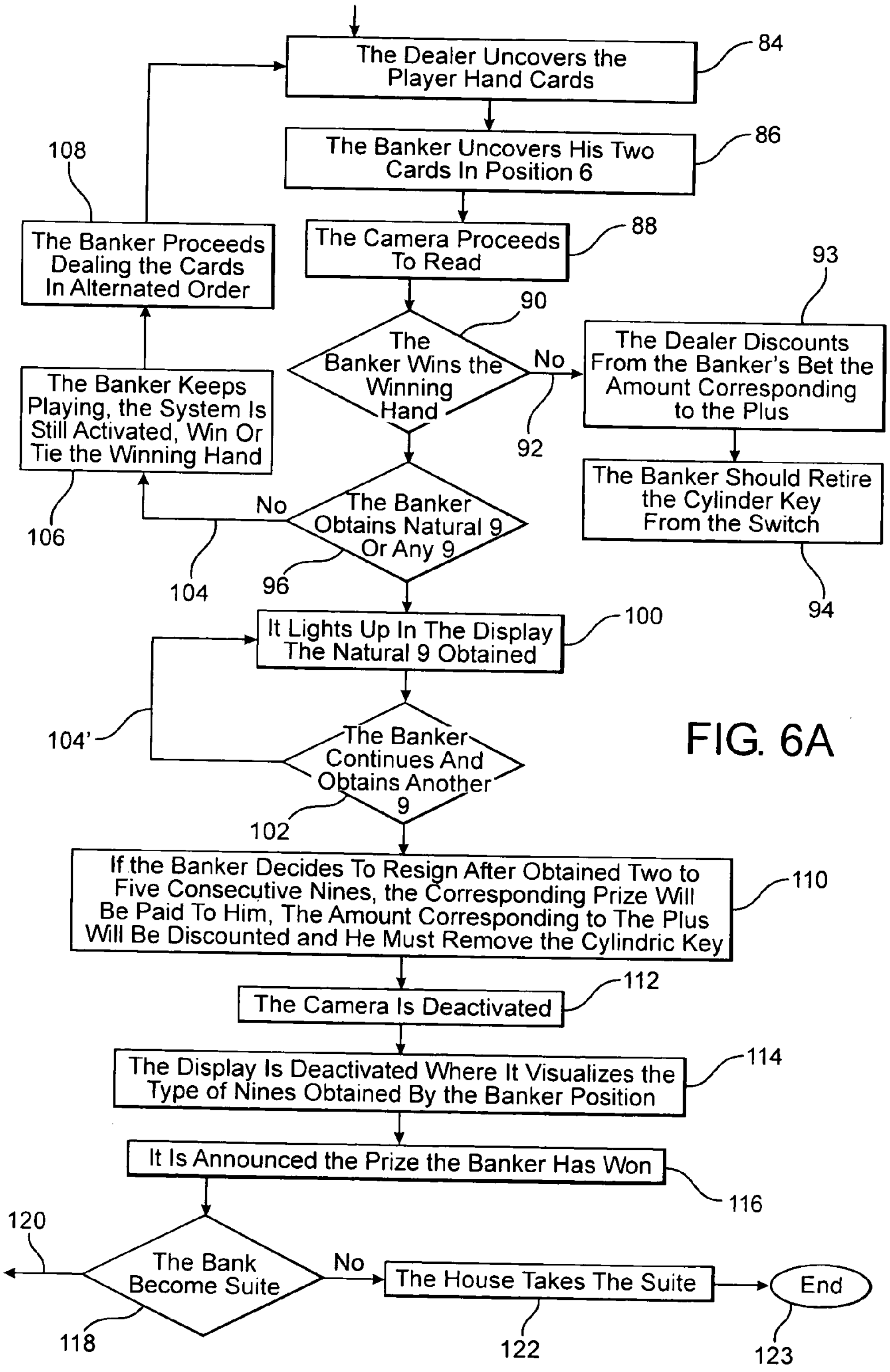
FIG. 6A is a continuation of the flow chart of FIG. 6.
Figure 7:
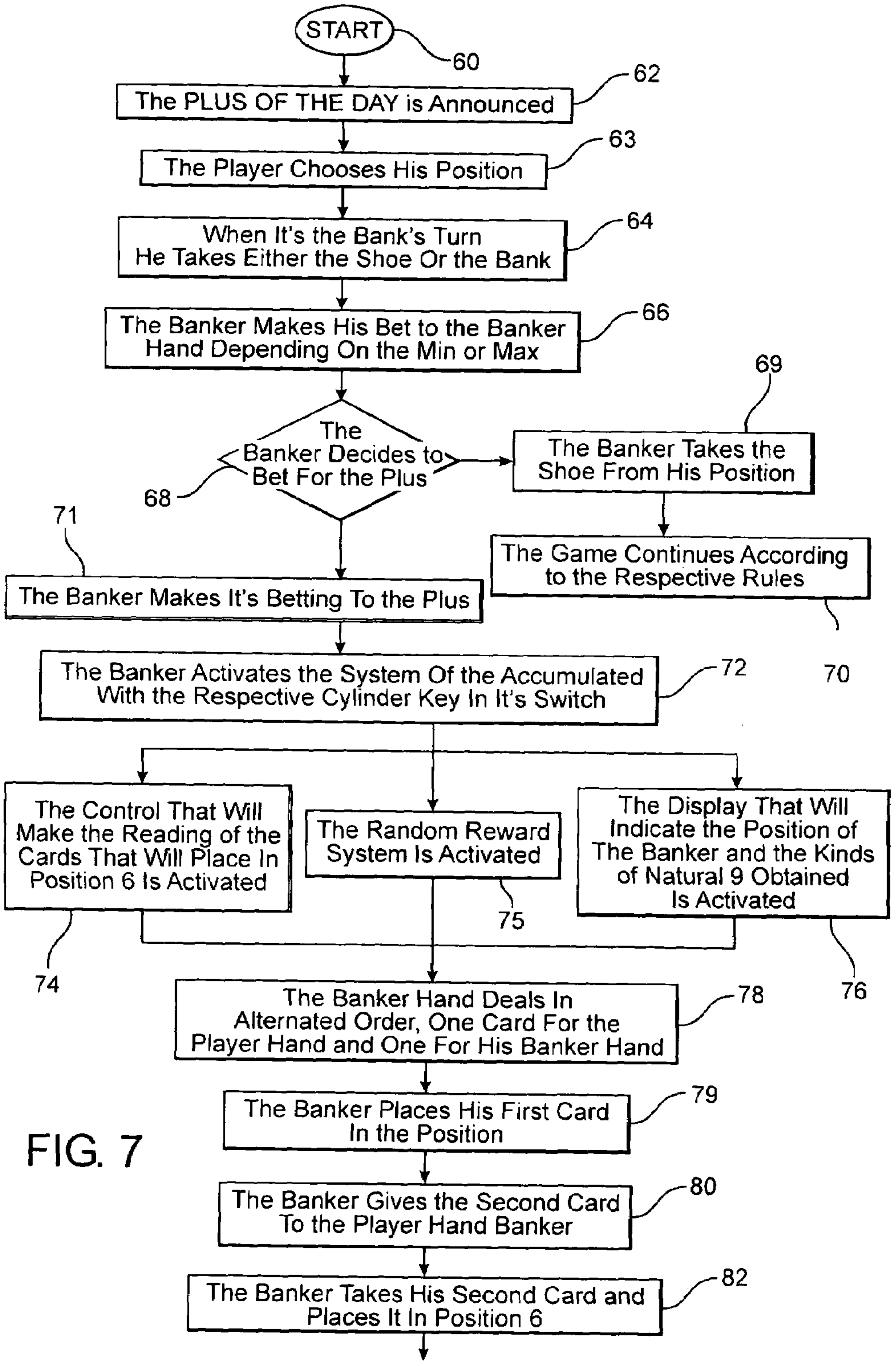
FIG. 7 is a flow chart schematically representing yet another embodiment of the method of playing a variation of the card game baccarat in accordance with the present invention.
Figure 7A:
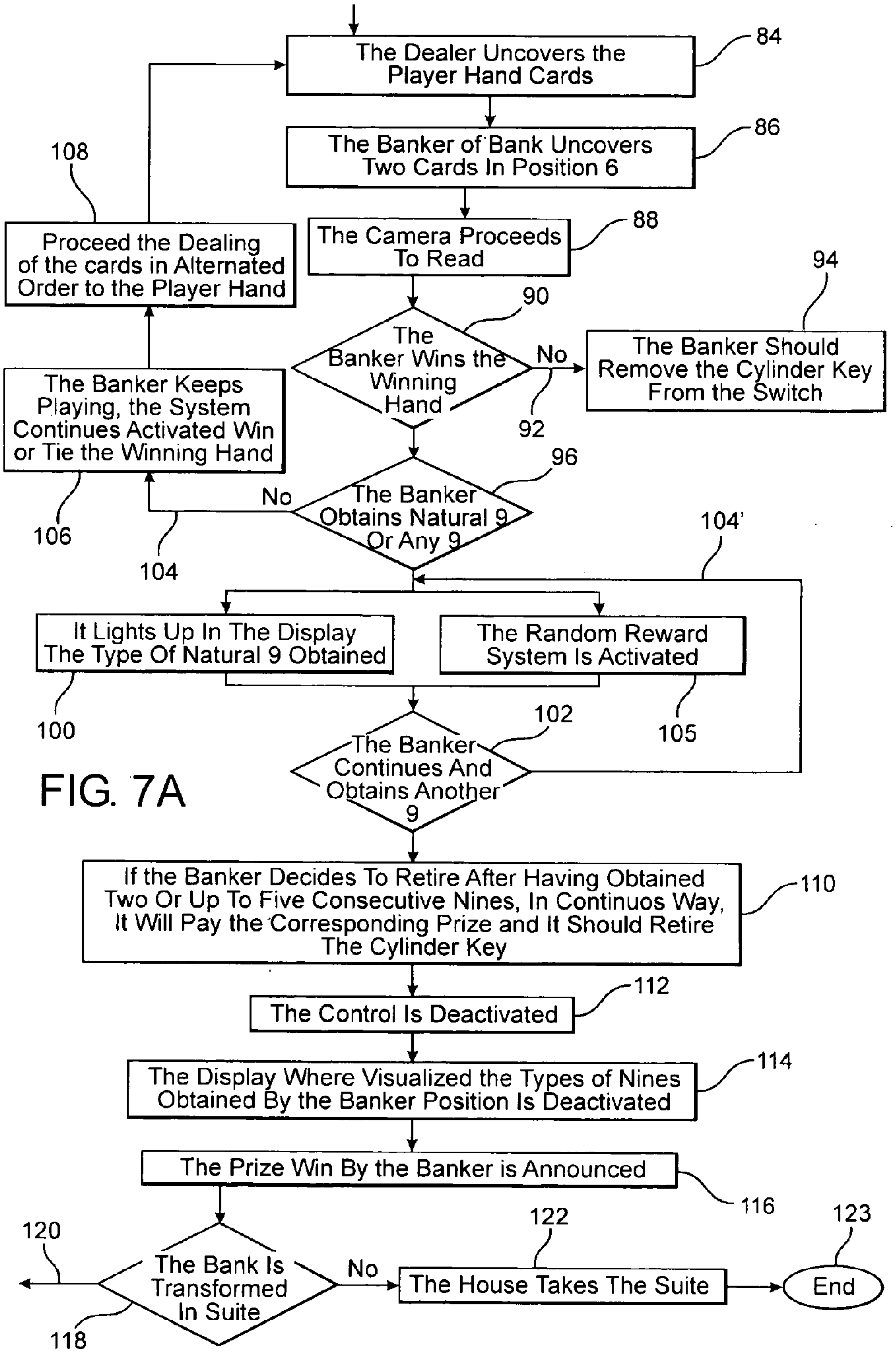
FIG. 7A is a continuation of the flow chart of FIG. 7.

In yet another embodiment of the method of playing the variation "baccarat plus" as represented in FIGS. 7 and 7A, a random system is activated to increase the bonus payout initially announced by the casino as at 62, in the event that more than two consecutive banker's hands are made, such as three, four, five or more consecutive hands, each of which have a total number count of nine. Therefore with reference to FIGS. 7 and 7A, after the banker makes or indicates his bonus wager as at 71, he activates the system utilizing or manipulating the key switch or by any other conventional method, such as on a respective one of the switch structure 56 as at 72. The activation of the switch first, as at 75, serves to activate the random reward system in the event that more than two consecutive banker's hands occur each having an equal number count of nine. The method of playing the variation of "baccarat plus" continues as set forth with regard to the embodiments of FIGS. 5, 5A and 6, 6A up to the point where more than two consecutive banker's hands are made. At this point, the bonus payout originally announced as at 62 in FIG. 6 is increased, because of the difficulty in achieving numerous consecutive hands. The increase is performed on a random basis as at 105. Such random increase in the bonus payout may occur by any random facility or regiment determined by the house and may be further determined electronically or by more conventional means such as the roll of dice, etc. Once the bonus payout as at 62 has been increased after obtaining the two consecutive banker's hands with an equal number count of nine, the game continues in the manner set forth with the embodiment of FIGS. 5, 5A and 6, 6A. With these embodiments, however, the casino will of course recognize that more than two consecutive hands accomplished by the banker is entitled to an increased bonus payout. Such bonus payout will be increased on a preset basis which is known to the banker and the player prior to the beginning of play.

With regard to the various preceding embodiments of the present method, it is recognized that although play in the more automated manner is permitted by the apparatus of the present invention, it may be preferred that a more manual system wherein the dealer merely identifies and/or collects the bonus wager, and manually determines and/or keeps track of the number of consecutive bonus hands may also be provided. Furthermore, as previously mentioned, alternate variations are also contemplated so as to provide for eligibility to a bonus payout to all participants to the game and not merely the person(s) that are actually playing a hand. For example, participants can choose to wager on the player or banker hands, both to merely win and as to the bonus payout. In such an embodiment, the participants may be required to bet before or after initial cards are distributed, or may be required to stay with the same side (i.e. player or banker) for consecutive games to accumulate multiple hands totaling nine and win a bonus payout. Of course, variations wherein the participant can change sides, but still receives multiple hands totaling nine may also be provided. Further, the bonus payout may be achieved only for consecutive hands totaling a predetermined number count, and/or a smaller bonus payout component may be provided merely for a win with a nine, a win with a natural nine, a win with a nine and all cards of the same suit, etc. Payout tables as illustrated below may be provided for such types of gaming variants.

Baccarat wild Plus

| | 1St Coin | 2nd Coin | 3rd Coin | 4th Coin | 5th Coin |
|---|---|---|---|---|---|
| 99999plus | 600 | 1200 | 1800 | 2400 | 5000 |
| 9999plus | 150 | 300 | 450 | 600 | 800 |
| 999plus | 10 | 20 | 30 | 40 | 50 |
| 99plus | 5 | 10 | 15 | 20 | 25 |
| 9plus | 2 | 4 | 6 | 8 | 10 |
| any 9 | 3 | 6 | 9 | 12 | 15 |
| any 9 | 3 | 6 | 9 | 12 | 15 |
| any 9 | 3 | 6 | 9 | 12 | 15 |
| any 9 | 3 | 6 | 9 | 12 | 15 |
| Winning whit 1-7 any 8-9 | 1 | 2 | 3 | 4 | 5 |

Baccarat Fantasy Plus

| | 1St Coin | 2nd Coin | 3rd Coin | 4th Coin | 5th Coin |
|---|---|---|---|---|---|
| 99999plus | 600 | 1200 | 1800 | 2400 | 5014 |
| 9999plus | 150 | 300 | 450 | 600 | 900 |
| 999plus | 10 | 20 | 30 | 40 | 50 |
| 99plus | 5 | 10 | 15 | 20 | 25 |
| 9plus | 2 | 4 | 6 | 8 | 10 |
| any 9 | 3 | 6 | 9 | 12 | 15 |
| any 9 | 3 | 6 | 9 | 12 | 15 |
| any 9 | 3 | 6 | 9 | 12 | 15 |
| any 9 | 3 | 6 | 9 | 12 | 15 |
| Winning whit 1-7 any 8-9 | 1 | 2 | 3 | 4 | 5 |

Baccarat Mistery Plus

| | 1St Coin | 2nd Coin | 3rd Coin | 4th Coin | 5th Coin |
|---|---|---|---|---|---|
| 99999plus | 1000 | 2000 | 3000 | 4000 | 15047 |
| 9999plus | 600 | 1200 | 1800 | 2400 | 5000 |
| 999plus | 100 | 200 | 300 | 400 | 650 |
| 99plus | 10 | 20 | 30 | 40 | 50 |
| 9plus | 2 | 4 | 6 | 8 | 10 |
| any 9 | 4 | 8 | 12 | 16 | 20 |
| any 9 | 4 | 8 | 12 | 16 | 20 |
| any 9 | 4 | 8 | 12 | 16 | 20 |
| any 9 | 4 | 8 | 12 | 16 | 20 |
| Winning whit 1-7 any 8-9 | 1 | 2 | 3 | 4 | 5 |

Figure 8:
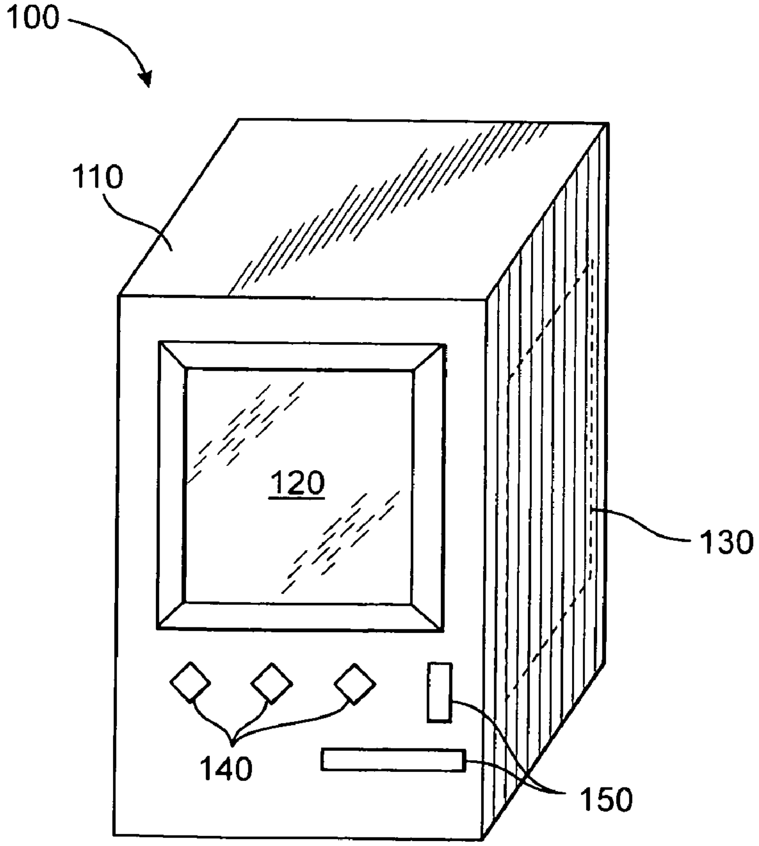
FIG. 8 is a perspective illustration of the automated baccarat gaming assembly embodiment of the present invention.

Looking now to the first preferred embodiments of FIGS. 1 and 8, the present invention further includes a baccarat gaming assembly, generally indicated as 100. Specifically, the gaming assembly 100 is preferably an automated, computer type game, thereby requiring no physical dealer, and permitting a single player/user or multiple players/users to enjoy the game play. To this end, the gaming assembly 100 preferably is integrated into its own, stand alone unit, although use on a standard computer, such as for home use is contemplated, and as such, the assembly includes a housing 110. Preferably the housing 110 is similar in shape and size to that of a slot machine or video poker machine, thereby permitting large numbers of the assemblies 100 to be placed in an array near one another. Furthermore, as depicted in FIG. 1, a multi-user configuration may be provided wherein a number of users may achieve "linked" or simultaneous play with one another so as to increase the excitement of the play.

The baccarat gaming assembly 100 also preferably includes at least one display 120. As illustrated, a standard video display or other type of display to provide an attractive appearance and to effectively and graphically illustrate the progress of the game to a user may be provided. Further, as in the embodiment of FIG. 1, a series of displays and/or one or more central display 120, such as if linked play at various locations is desired, may also be provided. For example, a number of player stations may be established within a proximity to one another and/or in spaced relation throughout a venue and/or throughout various venues. Accordingly, one or more displays 120 are preferably provided so that each user may effectively monitor game play.

Additionally, the present gaming assembly 100 also preferably includes at least one input, such as in the form of a user actuatable selector 140. Preferably, the user actuatable selector 140 includes one or more selectors, such as using physical buttons, a touch screen, joystick, voice activated selector, etc., the objective being to allow the user to make certain decisions such as a wagering amount, whether to change a card, whether to make a bonus wager, etc. Further, in the multi-player environment, each user preferably includes their own input so that they may make any individual choices available to them. For example, in one embodiment represented in FIG. 8, each individual player station may include a display and an input, such as in the form of a touch screen. Furthermore, as wagering is usually involved in the game play, a payment receiving assembly, such as one or more slots 150 for receiving credits, such as money, either in coins, tokens, credits, bills, cards, etc. is also preferably provided, either at a central location and/or in connection with each single player or multi-player gaming station.

The baccarat gaming assembly 100 further includes at least one computer processor 130. The computer processor 130 is structured to be responsive to the user and to generate a player hand and a banker hand in accordance with the rules of baccarat. Along these lines, the computer processor 130 is structured to define a deck from which the cards which comprise the player's hand and the banker's hand are dealt. For example, it is recognized that a multiple deck shoe may be used in conventional baccarat, and as such the deck defined by the computer processor may include one or more conventional 52 card decks as may be desired by the house, or in some cases by the user. Furthermore, the computer processor 130 is structured to continue to generate new ones of the player's hand and the banker's hand with the cards from the deck until a number of remaining cards of the deck drops below a predefined minimum number of cards. For example, as with a conventional shoe, when the remaining cards in the deck becomes too small, as dictated by the house or a cut by the user, a new deck must then be generated. Furthermore, the computer processor 130 may be structured to permit subsequent users of the gaming assembly 100 to continue to use the deck of a previous user, if desired. Specifically, it is understood that in many instances users may try to gage the outcome of a hand based upon the number of cards remaining in the deck or the "luck" of a given deck. As such, if a user no longer wishes to use the same deck they may request a new deck, either affirmatively, if permitted, or by exiting as a user and restarting a new user. Moreover, if an observer believes they can gain an advantage based upon what they have seen or believe from a prior user, they may be given the option to continue with the old deck. Along these lines, it may be preferable to provide a graphic display or illustration on the display 120 of the number of cards remaining in a deck. Although an exact count could be provided, it is preferred that an illustration which requires the user to gage or keep track of the deck size is preferred. Such graphic illustration could also be used to allow the deck to be cut by the user. Of course, in a multi-player game, restrictions on a user's ability to reset a new deck and random or rotating cutting of the deck may also be provided.

Because the conventional rules of baccarat are often quite strict as to when a card may or may not be drawn, thus eliminating an important human element from the game, certain embodiments of the present invention further structure the computer processor to provide one or more variants to make the game more interesting and/or interactive to a user. For example, in one embodiment, the computer processor 130 is structured to allow the user to select whether they wish to play the player's hand or the banker's hand. As such, even though the cards for the hands may be dealt according to traditional rules, the user has some part in determining the outcome, the user being designated as a winner, if the winning hand based upon the final number count, is the hand designated as the user's hand.

As yet another alternative, the computer processor 130 may be structured to deal both the player's hand and the banker's hand, with one card from each hand being visible, and allowing the user to accept or reject the visible card from one or both hands. Specifically, either before or after the user has elected to play as the player or the banker, the user can see one of the cards of each hand. If the visible card is desirable, the user may keep that card and continue with play. If, however, the user does not want one or both of the visible cards to remain, he can select to discard one or both, a new card being provided by the computer processor. In this regard, it is recognized that the user may elect to keep or reject a visible card based upon which hand he is playing and whether he wants a specific hand to be a winner for himself/herself or a loser for the computer processor. As such, the computer processor may be programmed such that the user can only discard the visible card from the hand they have elected to play, the hand they have not elected to play, only one visible card from either hand, or the visible card from both hands. Also, as mentioned, this discard/card replacement process can take place before or after the user has elected which hand to play, and/or in another variant the replacement cards may be shown or withheld until the user elects which hand to play. For example, the user may select one or both cards to be discarded, after which the cards are removed, but no new card is shown to the user until they have elected whether to play as the player or bank. It is also recognized that in addition to a variation wherein the cards are visible and the user merely selects which hand to play without any discards, the discard variations are also available to a multi-player game. In such a multi-player game, however, it may be preferred that a single user be charged with selecting the discards for the common hands, or a voting or polling system may be employed such that all users make a selection and the majority or randomly selected decision decides which cards to discard and replace.

In addition to and/or instead of the above variants, the computer processor 130 may also be structured to permit the user to elect to draw a card or stand pat when the number total of the initial two cards of the user hand totals five. Specifically, conventional rules of the card game baccarat often designate on what number counts a card must or must not be taken. By providing the user with the option, they now have a more interactive part in the outcome of at least some hands. Preferably, however, in an embodiment wherein the computer processor is structured to give the user the option, it is preferred that the option be available only if the user's hand is the player's hand.

Looking once again to the previously recited bonus payout method of the present invention, such a system may also be integrated into the baccarat gaming assembly 100, either alone and/or preferably in conjunction with one or more of the previously recited variants provided by the computer processor 130. Specifically, in such an embodiment, the computer processor 130 is structured to keep track of at least consecutive ones of the user's hand, and/or all hands, and especially the final number counts thereof. In particular, if the final number counts of at least two consecutive ones of the user's hands or in another variation either the player's or banker's hands, equal a certain predefined number count, such as preferably nine or a natural nine, the computer processor is structured to indicate a bonus payout for the user. Furthermore, the computer processor 130 may be structured to continue to monitor continuing hands, increasing the bonus payout if more than two consecutive hands have the same, predefined final number count, and preferably terminating the increase of the bonus payout once a sequential one of the user's hands or any hand does not match the preceding hand. As with the previous embodiments, the computer processor 130 may be structured to pay the bonus payout regardless if at least two consecutive hands have the matching predetermined number count, or can be structured to make a bonus payout if the user lets the bonus payout "ride" on subsequent hands. In such an embodiment the computer processor is preferably responsive to a user decision to cash out their bonus payout or altogether if required to cash out the bonus payout. In one embodiment, the computer processor 130 is structured to accumulate the bonus payout only if the matching consecutive ones of the user's hand are all either banker's hands or player's hands. As such, a user may not switch between player and banker and continue to be eligible for a bonus payout based upon the preceding hand. Naturally, a variant whereby the user can switch sides is also contemplated. Furthermore, it is also contemplated that in some embodiments the bonus payout is made regardless of whether the user wins or loses a specific hand, so long as a nine or other predefined number count is achieved by the user's hand, or if desired by either hand. In such an embodiment, if both hands have the same predefined number count, the computer processor may be structured to count two hands towards the bonus payout. Indeed, in such an embodiment the outcome of the game itself need not be a material factor, and the user can play only for the bonus payout, discarding visible cards, for example, so as to maximize their chances of obtaining that number count with at least one of the hands, and thereby keeping the bonus play going, and preferably increasing, into subsequent hands.

Also in the illustrated embodiment, the baccarat gaming assembly 100, and in particular the computer processor 130 may be structured to require a bonus wager in order for the user to be eligible for the bonus payout. As with previous embodiments, this bonus wager may be part of the base wager or an additional required amount. Also, as with slots, the bonus wager may include a requirement that a maximum bet be made on the corresponding hands for them to be eligible to cause a match for a bonus payout. In such an embodiment, the computer processor 130 may be structured to permanently deduct the bonus wager if the final number count of a given hand does not match the predetermined required number count, such as nine, or if after having a first hand match the predetermined required number count, a subsequent hand does not. If such a permanent deduction of the bonus wager occurs, the computer processor 130 may be structured to accept another bonus wager, thereby making the user eligible for the bonus payout once again.

Still, however, so as to further entice play of the baccarat gaming assembly 100, the initial wager made by the player may be sufficient to qualify the player for a bonus, and/or the bonus wager may be the only bet required. Viewing a preferred embodiment, the payout can be based not only on the number of consecutive hands totaling nine, but also on the number of credits played and/or the actual type of winning hand as in the payout tables previously illustrated. For further example, the table below may be illustrative of the payouts to be made for winning hands, including consecutive nines, as varied depending upon the number of credits played.

| | Payout if 1 Credit Played | Payout if 2 Credits Played | Payout if 3 Credits Played | Payout if 4 Credits Played | Payout if 5 Credits Played |
|---|---|---|---|---|---|
| 5-9s | 600 | 1000 | 1600 | 4250 | Jackpot |
| 4-9s | 480 | 800 | 1280 | 2720 | 4480 |
| 3-9s | 240 | 400 | 640 | 1360 | 2240 |
| 2-9s | 120 | 200 | 320 | 680 | 1120 |
| 1-9 | 12 | 20 | 40 | 85 | 140 |
| 8 Win | 5 | 10 | 15 | 30 | 40 |
| 1-7 Win | 3 | 5 | 7 | 8 | 10 |

As is seen from the table, any win by the player results in a payout, however, certain types of wins, including consecutive wins with a total of nine (9), provide for a larger payout. Such a scheme provides incentive to players for continued play and/or for larger wagers on each play, while still sufficiently preserving the house advantage. Further, as with the previous payout tables, the bonus payout may be provided merely if the user's hand is a nine or a natural nine. In particular, one amount is paid merely for winning with any hand, and increased or bonus payout amount is provided if the user wins with a nine, and a further increased bonus pay out results if the player wins with a natural nine. Such increased pay outs maybe used independently or in association with the bonus payout for consecutive hands having the total of nine. Likewise, the number of credits played affects the eventual payout.

In yet another embodiment of the present gaming assembly 100, the computer processor 130 may be structured to permit a winning user a "Tie" or a "Double or Nothing" option. For example, in the "Double or Nothing" option, after a user has won a particular hand, they will be presented with a choice to continue with a new hand, or to wager their winnings, double or nothing. If the user elects to wager their winnings as double or nothing a subsequent contest ensues. In one embodiment, the contest may include the display of one uncovered card and one, but preferably a plurality of covered cards. The user then selects which of the covered cards will be theirs, and if the covered card is higher than the visible card, the user wins and doubles his/her money. Conversely, if the card selected by the user is less than the originally uncovered card, the user loses his/her winnings from the previous hand. Of course, it is understood that many variants of the double or nothing scheme may be employed.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A baccarat gaming assembly comprising:

a) a computer processor;

b) a display;

c) an input;

d) said input including at least one user actuatable selector;

e) said computer processor structured to generate a player's hand and a banker's hand in accordance with the rules of baccarat;

f) at least one of said hands including an initially visible card and an initially concealed card;

g) said computer processor further structured to designate one of said hands as a user's hand and another one of said hands as a house's hand in response to a user selection;

h) said computer processor responsive to a user input and structured to permit the user to selectively discard said initially visible card and to issue a new card to complete said hand;

i) said computer processor structured to selectively add cards to said player's hand and said banker's hand in accordance with the conventional rules of the card game of baccarat;

j) said computer processor structured to correspondingly designate said player's hand or said banker's hand as a winning hand if a final number total of one of said hands is greater than a final number total of the other of said hands; and k) said computer processor structured to designate said user as a winner if said user's hand is also said winning hand.

2. A baccarat gaming assembly as recited in claim 1 wherein said computer processor is structured to generate both of said hands with an initially visible card and an initially concealed card.

3. A baccarat gaming assembly as recited in claim 2 wherein said computer processor is structured to discard said initially visible card from either of said hands in response to said user input.

4. A baccarat gaming assembly as recited in claim 2 wherein said computer processor is structured to discard said initially visible card from only one of said hands in response to said user input.

5. A baccarat gaming assembly as recited in claim 2 wherein said computer processor is structured to discard said initially visible card from both of said hands in response to said user input.

6. A baccarat gaming assembly as recited in claim 1 wherein said computer processor is structured to designate one of said hands as said user's hand and another one of said hands as said house's hand in response to said user selection before issuing said new card in response to said user input electing to selectively discarding said initially visible card.

7. A baccarat gaming assembly as recited in claim 1 wherein said computer processor is structured to designate one of said hands as said user's hand and another one of said hands as said house's hand in response to said user selection after permitting said user input to selectively discard said initially visible card and issuing said new card.

8. A baccarat gaming assembly as recited in claim 1 wherein said computer processor is structured to display said initially visible card before identifying said user selection of said banker's hand or said player's hand.

9. A baccarat gaming assembly as recited in claim 1 wherein said computer processor is structured to display said initially visible card after identifying said user selection of said banker's hand or said player's hand.

10. A baccarat gaming assembly as recited in claim 1 wherein said computer processor is structured to keep track of consecutive hands in consecutive games having said final number total equal nine.

11. A baccarat gaming assembly as recited in claim 10 wherein said computer processor is structured to designate a bonus payout to said user upon at least two of said consecutive hands having said final number total equal nine.

12. A baccarat gaming assembly as recited in claim 11 wherein said computer processor designates said bonus payout if said consecutive hands having said final number count total equal nine include a combination of said user's hands or said house's hands.

13. A baccarat gaming assembly as recited in claim 11 further comprising a wager receptacle structured to receive a wager placed by the user.

14. A baccarat gaming assembly as recited in claim 13 wherein said wager receptacle is operatively associated with said computer processor.

15. A baccarat gaming assembly as recited in claim 14 wherein said computer processor is structured to identify a bonus wager made by the user at said wager receptacle in order to make the user eligible for said bonus payout.

16. A baccarat gaming assembly as recited in claim 15 wherein said computer processor is structured to carry over said bonus wager to a subsequent game upon at least one of said hands having said final number total equal nine.

17. A baccarat gaming assembly as recited in claim 1 further comprising a plurality of inputs operatively associated with said computer processor so as to allow for multiple, simultaneous users.

18. A baccarat gaming assembly as recited in claim 17 wherein said computer processor is responsive to said user input of only one of said users for selectively discarding said initially visible card.

19. A baccarat gaming assembly as recited in claim 17 comprising a plurality of said displays.

20. A baccarat gaming assembly as recited in claim 1 wherein said input includes a touch screen.

21. A baccarat gaming assembly as recited in claim 1 wherein said input includes at least one actuation button structured to define said user actuatable selector.

22. A baccarat gaming assembly comprising:

a) a computer processor;

b) a display;

c) an input;

d) said input including at least one user actuatable selector;

e) said computer processor structured to generate a player's hand and a banker's hand in accordance with the rules of baccarat;

f) said computer processor further structured to generate said player's hand and said banker's hand with an initially visible card and an initially concealed card;

g) said computer processor further structured to designate one of said hands as a user's hand and another one of said hands as a house's hand in response to a user selection;

h) said computer processor structured to correspondingly designate said player's hand or said banker's hand as a winning hand if a final number total of one of said hands is greater than a final number total of the other of said hands; and i) said computer processor structured to designate said user as a winner if said user's hand is also said winning hand.

* * * * *